(12) United States Patent
Back et al.

(10) Patent No.: US 9,211,904 B2
(45) Date of Patent: Dec. 15, 2015

(54) STEERING COLUMN FOR A MOTOR VEHICLE WITH A SUPPORT PART

(71) Applicants: Rodrigo Back, Wangs (CH); Robert Galehr, Mauren (LI)

(72) Inventors: Rodrigo Back, Wangs (CH); Robert Galehr, Mauren (LI)

(73) Assignee: ThyssenKrupp Presta Aktiengesellschaft, Eschen (LI)

( * ) Notice: Subject to any disclaimer, the term of this patent is extended or adjusted under 35 U.S.C. 154(b) by 0 days.

(21) Appl. No.: 14/380,681

(22) PCT Filed: Jan. 18, 2013

(86) PCT No.: PCT/EP2013/000147
§ 371 (c)(1),
(2) Date: Aug. 22, 2014

(87) PCT Pub. No.: WO2013/124024
PCT Pub. Date: Aug. 29, 2013

(65) Prior Publication Data
US 2015/0013493 A1 Jan. 15, 2015

(30) Foreign Application Priority Data
Feb. 24, 2012 (DE) .......................... 10 2012 101 494

(51) Int. Cl.
*B62D 1/18* (2006.01)
*B62D 1/184* (2006.01)
*B62D 1/19* (2006.01)

(52) U.S. Cl.
CPC *B62D 1/18* (2013.01); *B62D 1/184* (2013.01); *B62D 1/195* (2013.01)

(58) Field of Classification Search
CPC ........... B62D 1/18; B62D 1/184; B62D 1/195
See application file for complete search history.

(56) References Cited

U.S. PATENT DOCUMENTS

| 5,503,431 A | 4/1996 | Yamamoto |
| 7,097,205 B2 * | 8/2006 | Camp et al. .................... 280/775 |

(Continued)

FOREIGN PATENT DOCUMENTS

| DE | 10145896 A1 | 7/2002 |
| EP | 0479455 B1 | 9/1996 |

(Continued)

OTHER PUBLICATIONS

German Language International Search Report for International patent application no. PCT/EP2013/000147; mailing date Apr. 25, 2013.

(Continued)

*Primary Examiner* — Paul N Dickson
*Assistant Examiner* — Timothy Wilhelm
(74) *Attorney, Agent, or Firm* — ThyssenKrupp North America, Inc.

(57) ABSTRACT

The invention relates to a steering column for a motor vehicle, with a support part for directly or indirectly mounting the steering column on a body of the motor vehicle and with at least one carriage displaceably mounted in a displacement direction on the support part, at least in the event of a crash, wherein a steering spindle of the steering column is rotatably mounted directly or indirectly on the carriage, wherein the carriage is clamped onto the support part by means of at least one clamping device of the steering column, wherein the carriage is further braced on the support part by at least two contact points arranged on opposite sides of the clamping device and spaced away from the clamping device, wherein at least one free space between the carriage and the support part is arranged in regions between the clamping device and each of the contact points.

17 Claims, 5 Drawing Sheets

(56) References Cited

U.S. PATENT DOCUMENTS

| | | | |
|---|---|---|---|
| 8,899,128 B2* | 12/2014 | Maniwa et al. | 74/493 |
| 8,984,984 B2* | 3/2015 | Yokota et al. | 74/493 |
| 8,997,603 B2* | 4/2015 | Buzzard | 74/493 |
| 2002/0033593 A1 | 3/2002 | Hancock et al. | |
| 2003/0172765 A1* | 9/2003 | Heiml | 74/493 |
| 2009/0250916 A1* | 10/2009 | Olgren et al. | 280/775 |
| 2011/0036198 A1* | 2/2011 | Minamigata | 74/493 |
| 2011/0187089 A1* | 8/2011 | Sakata | 280/775 |
| 2012/0248752 A1* | 10/2012 | Maniwa et al. | 280/779 |
| 2012/0318092 A1* | 12/2012 | Kuroumaru | 74/492 |
| 2013/0160596 A1* | 6/2013 | Tanaka | 74/493 |
| 2014/0284910 A1* | 9/2014 | Schnitzer | 280/779 |
| 2014/0331810 A1* | 11/2014 | Okano et al. | 74/493 |

FOREIGN PATENT DOCUMENTS

| | | |
|---|---|---|
| EP | 1939064 A1 | 7/2008 |
| EP | 2353966 A2 | 8/2011 |
| GB | 2411156 B | 2/2006 |

OTHER PUBLICATIONS

English Translation of International Search Report for International patent application no. PCT/EP2013/000147; mailing date Apr. 25, 2013.

English Abstract of U.S. counterpart to German patent DE10145896A1, U.S. Appl. No. 2002/0033593. (Note: English Abstract of DE10145896 is not available. U.S. Appl. No. 2002/0033593 has been listed above under U.S. Patent App. Publications.).

* cited by examiner

STEERING COLUMN FOR A MOTOR VEHICLE WITH A SUPPORT PART

CROSS REFERENCE TO RELATED APPLICATIONS

This application is a U.S. National Stage Entry of International Patent Application Serial Number PCT/EP2013/000147, filed Jan. 18, 2013, which claims priority to German patent application no. DE 102012101494.9, filed Feb. 24, 2012.

FIELD

This invention relates to a steering column for a motor vehicle.

BACKGROUND

Steering columns of the type in question for motor vehicles are known from DE 101 45 896 A1, U.S. Pat. No. 5,503,431 A, GB 2 411 156 B, EP 0 479 455 B1 and EP 1 939 064 A1, for example.

The displaceability of the slide in the event of a crash serves to ensure that the steering wheel together with the steering spindle can be pushed out of the passenger compartment in the event of an accident, i.e. in the event of a crash, in order to reduce the risk of injury to the driver of the vehicle or at least to reduce the severity of injuries to the driver of the vehicle.

SUMMARY

The present invention relates to a steering column for a motor vehicle with a support part for direct or indirect fastening of the steering column on a body of the motor vehicle and having at least one slide, which is mounted on the support part in such a way that it can be displaced in a displacement direction, at least in the event of a crash, wherein a steering spindle of the steering column is supported directly or indirectly on the slide in such a way as to be rotatable.

It is an object of the invention to make available a low-vibration steering column of the type mentioned above that can be produced in a particularly simple manner.

This is achieved by means of a steering column as claimed in patent claim 1.

BRIEF DESCRIPTION OF THE DRAWING

The present disclosure is described in detail below with reference to the attached drawing figures, wherein.

DETAILED DESCRIPTION

Thus, according to the invention, it is envisaged that the slide is clamped onto the support part by means of at least one clamping device of the steering column, wherein the slide is additionally supported on the support part at at least two contact points arranged on mutually opposite sides of the clamping device and at a distance from the clamping device, wherein at least one free space is in each case arranged between the slide and the support part in regions between the clamping device and the contact points. To increase rigidity, it is advantageous if the position of the slide relative to the support part can change only along the displacement direction.

In the case of the steering column according to the invention, the support part can be fastened directly on a body of a motor vehicle. However, it is also conceivable and possible to enable fastening with some other part, e.g. a holding part, in between. This is advantageous particularly in the case of steering columns, the position of which is to be adjustable relative to the motor vehicle.

By means of the clamping device arranged between the contact points but also at a distance from the contact points, it is possible when clamping the clamping device to deform the slide and, if appropriate, also the support part elastically or possibly even plastically to a certain extent. The free space mentioned between the slide and the support part in the region between the clamping device and the respective contact points allows this kind of deformation. As a result, it is possible to set the load with which the slide is held on the support part relatively accurately without the need for particularly stringent requirements on the production accuracy of the support part and the slide. This makes it possible to permit relatively large tolerances in the production of these parts, thus allowing simple and low-cost production of these components and hence of the entire steering column.

It is thus important here that a free space should be arranged between the slide and the support part in said regions between the clamping device and the respective contact point. This means that the slide and the support part do not rest on one another in these regions and are also not otherwise supported on one another, thus allowing a certain deformation of the slide and, if appropriate, also of the support part in the region of these free spaces.

In preferred embodiments, the slide is of tubular design, at least in the region of the clamping device or in the region between the contact points. It is advantageous if the clamping device is adjustable. In other words, the clamping force applied by the clamping device is preferably adjustable.

The steering spindle is the component by means of which the steering movement applied by the driver of the vehicle by turning the steering wheel is transmitted by the steering wheel to the steering gear and hence toward the front wheels of the motor vehicle. It is advantageous if the steering spindle is supported directly or indirectly on the slide in such a way as to be rotatable about its longitudinal axis.

The support part can be fastened on the body of the motor vehicle by means of appropriate lugs. The support part is therefore the steering column component that is said to be fixed in relation to the body. Whether the support part is fastened directly or indirectly on the body here is immaterial. As already explained at the outset, however, the support part can also be fastened on the body with a holding part in between.

A crash refers to an accident in which the motor vehicle hits another motor vehicle or some other object. In this crash, the slide is displaced relative to the support part if correspondingly high forces occur, with the result that the steering spindle together with the steering wheel fastened thereon is pushed at least by a certain amount out of the passenger cell in the direction of the front wheels in order to avoid injury or at least minimize the severity of injury to the driver of the motor vehicle. This displacement of the slide relative to the support part in the event of a crash also serves in general for the controlled absorption of the forces and energy which arise during the crash. Through appropriate setting of the clamping forces applied by the clamping device between the support part and the slide and/or appropriate dimensioning of the arrangement, it is possible to adjust the degree of energy absorption during this relative motion. It is also possible, by appropriate setting and/or dimensioning, to specify a force above which the displacement of the slide relative to the support part is supposed to begin. Moreover, it is possible to provide further energy absorption means known per se in the prior art, e.g. bending, tearing/bending and/or pure tearing lugs or the like, also between the slide and the support part, in particular.

The support part and the slide should generally be made of metal. They can be bent sheet metal parts made of steel. However, the support part, in particular, can also be embodied as a casting and can thus be embodied in a way which is particularly advantageous for production.

Steering columns according to the invention can be steering columns that are rigid or non-adjustable in normal operation, where displacement of the slide and the support part relative to one another is envisaged only in the event of a crash. However, steering columns according to the invention can also be what are referred to as adjustable steering columns, which, as known per se, allow adjustments in the longitudinal direction of the steering spindle and/or the vertical direction in order to adapt the position of the steering wheel to the driver of the vehicle. Here, adjustment in the vertical direction is preferably accomplished by pivoting the support part, together with the slide, about a pivoting axis relative to the body of the motor vehicle. For this purpose, the pivoting axis can be supported in a holding part fixed in relation to the body. The contact points can be spaced apart from the clamping device in the displacement direction. However, particularly preferred embodiments of the invention provide for the contact points to be spaced apart from the clamping device in a direction orthogonal with respect to the displacement direction. Preferred variants can provide for the contact points to be extended longitudinally in the displacement direction. It is also possible for the contact points to be arranged so as to be spaced apart and/or one behind the other in the displacement direction. It is advantageous if the direction orthogonal with respect to the displacement direction is also orthogonal with respect to the clamping direction of the clamping device. The clamping direction of the clamping device is the direction in which the clamping device clamps the slide onto the support part. In the case of tubular slides or slides which are tubular at least locally, it is advantageous if the contact points are spaced apart from the clamping device in the circumferential direction of the slide.

Particularly preferred embodiments of the invention provide for the clamping device to be passed through an elongate hole extended longitudinally in the displacement direction. The elongate hole can be arranged in the support part or in the slide. It is then advantageous if the clamping device is arranged in a fixed manner on the other of said parts in each case, at least in relation to the displacement direction.

Particularly preferred embodiments of the invention provide for the clamping device to have at least one fastening bolt, which is passed through the elongate hole. In the case of a fastening bolt, e.g. screws or nuts which can be screwed onto or into the fastening bolt can be provided as clamping means or means for setting the clamping. By turning these screws or nuts, it is then also possible to set the clamping. Of course, other clamping means are also conceivable, e.g. preloading springs or the like.

With respect to the fastening bolt, it should be noted that the shape or peripheral shape thereof can be embodied in different ways. It can be round but does not have to be so. At any rate, it is advantageous if the fastening bolt is longitudinally extended. It is advantageous if the longitudinal extent of the fastening bolt coincides with the clamping direction of the clamping device in the region of the fastening bolt. It is furthermore advantageous if the slide can be clamped onto the support part in a clamping direction orthogonal to the displacement direction by means of the clamping device.

The counterforces applied by the steering column according to the invention to absorb energy in the event of a crash can be set by way of the corresponding clamping forces by means of the clamping device. However, it is furthermore also possible to modify the degree of energy absorption along the displacement path in the displacement direction by providing the support part and/or the slide and/or the clamping device with an appropriate shape. For example, it is advantageous in this regard if the steering column has at least one wedge surface, which is arranged between the slide and the support part or between the clamping device and the support part or between the clamping device and the slide, wherein the wedge surface rises or falls along the displacement direction. Controlled path-dependent energy absorption in the event of a crash can be provided by means of the angle of the wedge surface and the total lift made available by the wedge surface over the displacement path and by means of the profile of the wedge surface. For example, it is also advantageous in this regard if the clamping device is passed through an or the elongate hole extended longitudinally in the displacement direction, wherein the wedge surface is arranged, preferably formed, directly on a wall bounding the elongate hole. It is likewise advantageous if the wedge surface rises or falls in a direction parallel to a clamping direction in which the slide is clamped onto the support part by means of the clamping device in the region of the wedge surface.

However, such wedge surfaces can also act directly between the slide and the support part. In this regard, it is possible to implement illustrative embodiments according to the invention in that a projecting element rests on the wedge surface or slides along the wedge surface in the displacement direction in the event of a crash, wherein the wedge surface is fixed on a component which is selected from a group consisting of the slide and the support part and the clamping device, at least in relation to the displacement direction, and the projecting element is fixed on another of the components from this group, at least in relation to the displacement direction. It is advantageous here if the longitudinal extent of the projecting element in the displacement direction is shorter than the maximum possible displacement path in the displacement direction. In embodiments having an elongate hole, the displacement path can be predetermined by the boundary thereof or by longitudinal stops.

However, a simple way of implementing the path dependence of energy absorption in the event of a crash is also possible by limiting the length of the contact points in the displacement direction in a corresponding manner. Thus it is possible, on the one hand, to form the contact points over the entire maximum possible displacement path in the displacement direction. As an alternative, however, it is also possible to make the contact points shorter, as seen in the displacement direction, than the maximum possible displacement path, and a path dependence of energy absorption is also obtained by this means in the event of a crash.

For the sake of completeness, it is furthermore noted that the steering spindle is advantageously supported in a steering spindle bearing unit in such a way that it can be rotated about its steering spindle longitudinal axis. The steering spindle bearing unit can be the slide itself. However, it is also possible for the steering spindle unit to be fastened, preferably adjustably, on the support part, with the slide in between.

In particular, the steering column can be designed in such a way that the steering column has a fixing device, which can optionally be moved alternately between an open and a closed state, wherein, in the open state, the slide can be moved relative to the support part in the direction of the steering spindle longitudinal axis, and/or the support part can be pivoted about a pivoting axis relative to a holding part, which is formed on a body of the motor vehicle for the purpose of fastening the steering column, and wherein, in the closed state, the slide is fixed relative to the support part and to the holding part, provided that a force (F) acting on the steering spindle of the steering column along the steering spindle longitudinal axis does not exceed a predeterminable value.

Figure 1:
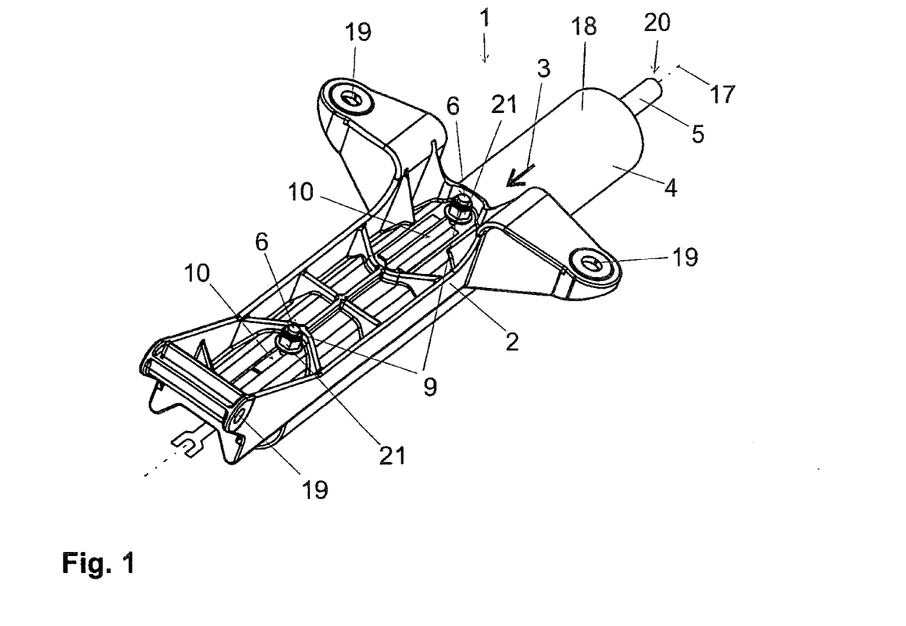
FIG. 1 is an isometric view of an embodiment of a non-adjustable steering column of the present disclosure.
Figure 2:
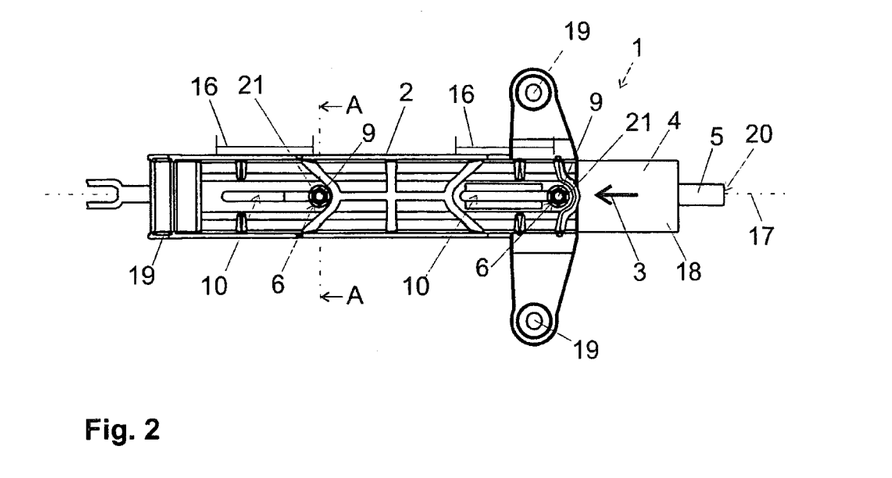
FIG. 2 is a top plan view of the non-adjustable steering column of FIG. 1.

First of all, FIGS. 1 and 2 show simplified illustrations of a steering column 1 according to the invention, in which, in normal operation, i.e. when there is no crash, the steering spindle 5 with its steering wheel connection 20 cannot be adjusted relative to the body and hence also relative to the support part 2. The support part 2 is used to fasten the steering column on the vehicle body (not shown here). In the illustrative embodiment shown, the support part 2 has the fastening lugs 19 for this purpose. In this first illustrative embodiment, the slide 4 which is clamped on the support part 2 by means of the clamping devices 6 is simultaneously the steering spindle bearing unit 18. The steering spindle 5 is supported in this steering spindle bearing unit 18 or in the slide 4 in such a way as to be rotatable about its longitudinal axis 17. The steering wheel that can be fastened on the steering wheel connection 20 is not shown in FIGS. 1 and 2.

Fundamentally, it should be noted that at least one clamping device 6 is provided according to the invention. However, it is also possible for a plurality of clamping devices 6 to be used to clamp or fasten the slide 4 on the support part 2. In the illustrative embodiments shown, there are in each case two clamping devices 6, which is to be seen as the preferred embodiment. These each have a fastening bolt 9. In the illustrative embodiments shown, the fastening bolts 9 and hence also the clamping devices 6 are arranged in a fixed manner on the slide 4 in relation to the displacement direction 3. The clamping devices 6 or fastening bolts 9 pass through elongate holes 10 in the respective support parts 2. The clamping forces of the clamping devices 6 can be set by means of the clamping nuts 21 by turning the clamping nuts 21 on corresponding threads of the fastening bolts 9. In the event of a crash, the steering spindle 5 together with the steering wheel and slide 4 is displaced in the displacement direction 3 relative to the support part 2 fixed in relation to the body. In the illustrative embodiments shown, the length of the elongate holes 10 determines the maximum possible displacement path 16. In all the illustrative embodiments according to FIGS. 1 to 4, the manner of fastening or clamping the slide 4 on the support part 2 is the same, and therefore this need only be explained once below. However, it may be noted in advance that, in the illustrative embodiment according to FIG. 3, the steering wheel 24 shown there, together with the steering spindle 5 and the steering spindle bearing unit 18, can be adjusted relative to the slide 4 and hence also relative to the support part 2 and to the vehicle body (not shown) in order to set the position of the steering wheel. For this purpose, the slide 4 and the steering spindle bearing unit 18 are separate components supported in telescopic fashion one inside the other in the illustrative embodiment according to FIG. 3. Adjustment of the steering spindle bearing unit 18 together with the steering spindle 5 and steering wheel 24 relative to the slide 4 is possible by means of a fixing device 23 known per se when the fixing device 23 is in an open state. In a closed state of the fixing device 23, the position of the steering spindle bearing unit 18 and hence also of the steering spindle 5 is fixed relative to the slide 4. As known per se, the fixing device 23 is adjusted by means of the adjusting lever 22 (illustrated schematically here) between its open state and its closed state. Of course, it is also possible to provide a motorized adjusting mechanism for the fixing device 23 instead of a manually operated adjusting lever 22. The longitudinal adjustment of the steering wheel 24, of the steering spindle 20 and of the steering spindle bearing unit 18 relative to the slide 4 takes place in the direction of the displacement direction 3 and in the opposite direction thereto. In the event of a crash, the slide 4 together with the fixing device 23 of the steering spindle bearing unit 18 of the steering spindle 5 and the steering wheel 24 is displaced relative to the support part 2 in displacement direction 3 in the same way as in the first illustrative embodiment. This is independent of the adjustability, added in this illustrative embodiment, of the steering column 1 in the longitudinal direction of the steering spindle 5.

Figure 3:
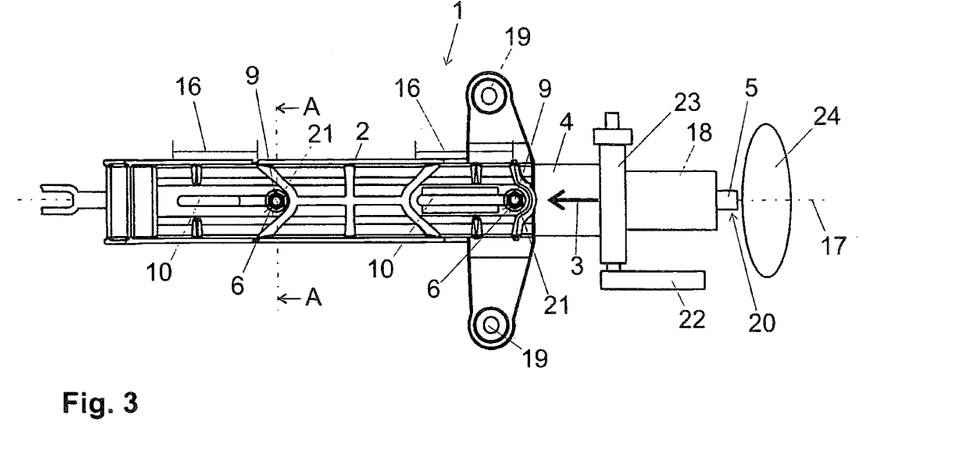
FIG. 3 is a top plan view of an embodiment of a longitudinally adjustable steering column of the present disclosure.
Figure 4:
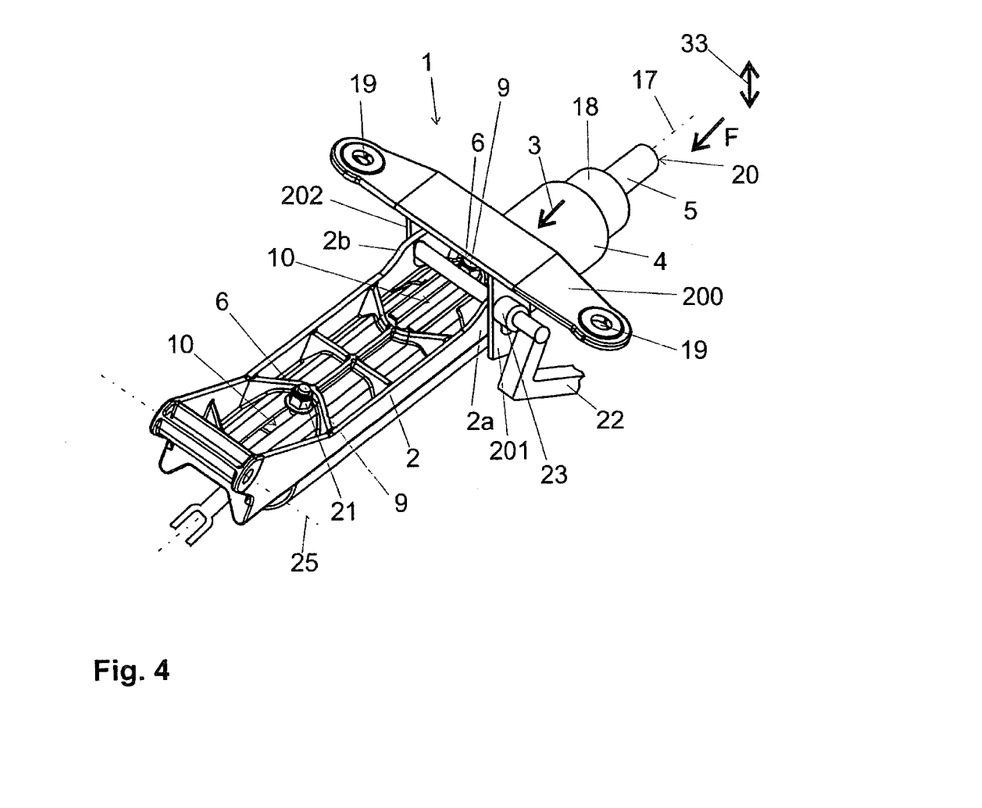
FIG. 4 is an isometric view of an embodiment of a longitudinally and vertically adjustable steering column of the present disclosure.

FIG. 4 furthermore shows, in schematic form, an illustrative embodiment in which, in addition to the longitudinal adjustment, there is also the possibility of vertical adjustment of the steering spindle 5 or of the steering wheel 24 in (not shown here). In this illustrative embodiment according to FIG. 4 too, the slide 4 and the steering spindle bearing unit 18 are two separate components, which are supported in telescopic fashion one inside the other. As explained in FIG. 3, longitudinal adjustment in the direction parallel to the displacement direction 3 takes place with the fixing device 23 correspondingly open. To provide the vertical adjustment, the support part 2 is supported in a known manner around a pivoting axis 25 in a holding part 200. To form the pivoting axis 25, the support part 2 is held on the body in such a way as to be rotatable at fastening points that are not shown. The two side faces 2a and 2b of the support part can be fixed, in particular clamped, to the fixing device 23 between the lateral cheeks 201, 202 of the holding part. Vertical adjustment in the directions 33 is accomplished by pivoting the support part 2, together with the slide 4, the steering spindle bearing unit 18 and the steering spindle 5 about the pivoting axis 25. For the sake of completeness, it may be noted that, as known in the prior art, this possibility of vertical adjustment in direction 33 is also only possible when the fixing device 23 has been moved into the open state by means of the adjusting lever. In this simple design, it is possible to provide the support part 2 as a single component, preferably made from an aluminum casting or magnesium casting, and nevertheless to integrate the multifarious crash and adjustment functions while achieving high rigidity of the steering column 1.

In this third illustrative embodiment according to FIG. 4 too, fastening of the slide 4 is accomplished by means of the clamping device 6 and the contact points 7 (explained below) as in all the illustrative embodiments described above. This will now be explained below by means of section AA from FIGS. 2 and 3 in a first illustrative embodiment. What is shown is thus in each case a section in the region of the front clamping device 6. The construction in the region of the clamping device 6 adjacent to the steering wheel is essentially the same, and therefore is not shown again separately here.

Figure 5:
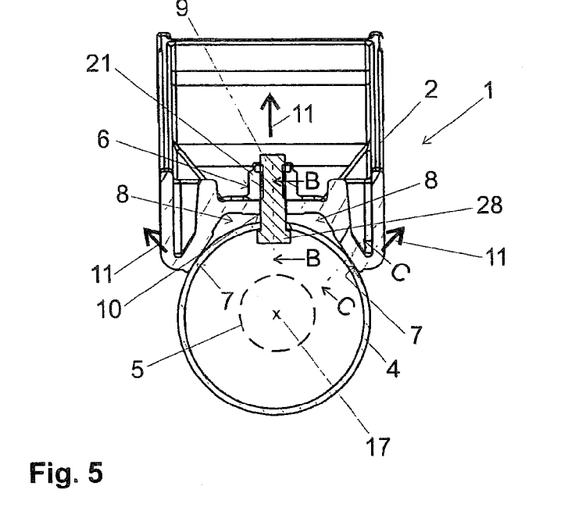
FIG. 5 is a section view of the embodiments of steering columns of FIGS. 2 and 3, taken through section lines AA.

FIG. 5 then shows the section AA mentioned from FIGS. 2 and 3. The section plane is normal to the steering spindle longitudinal axis 17. The steering spindle 5 is shown in dashed lines in the slide 4. It can now be seen in FIG. 5 how the slide is clamped onto the support part 2 in accordance with the invention by means of the clamping device 6, wherein the slide 4 is additionally supported on the support part 2 at at least two contact points 7 arranged on opposite sides of the clamping device 6 and at a distance from the clamping device 6. In the regions between the clamping device 6 and the contact points 7 there is in each case a free space 8 between the slide 4 and the support part 2. In the section plane shown, this is therefore a kind of three-point fastening of the slide 4 on the support part 2. On the one hand, the slide 4 rests on the two contact points 7 spaced apart from the clamping device 6. On the other hand, the slide 4 is clamped onto the support part 2 in clamping directions 11 by means of the clamping device 6. The free spaces 8, in which the slide 4 does not rest on the support part 2, make it possible, by appropriate adjustment of the clamping device 6, to set the desired contact pressure or clamping with which the slide 4 is clamped onto the support part 2. The free spaces 8 make it possible to deform the slide 4 and also, if appropriate, the support part 2 elastically and, if appropriate, also plastically to a certain extent by means of the clamping process in order to apply the required contact forces. In any case, a relatively large adjustment range is made available by the free spaces 8, and therefore relatively low requirements can be made on the production accuracy of the slide 4 and of the support part 2. In the illustrative embodiment shown in FIG. 5, the contact points 7 are spaced apart from the clamping device 6 in the circumferential direction of the slide 4, which is of tubular design. On the one hand, this circumferential direction is orthogonal with respect to the clamping directions 11 but, on the other hand, is also orthogonal with respect to the displacement direction 3.

In the illustrative embodiment shown, the clamping device 6 has a fastening bolt 9, which is supported and fastened in the slide 4 by means of its head 28. The clamping device 6 shown furthermore has a clamping nut 21, which is supported on the support part 2, thus allowing the fastening bolt 9 together with the slide 4 to be clamped against the support part 2 by screwing the clamping nut 21 by an appropriate amount onto the fastening bolt 9. The fastening bolt 9 and hence the clamping device 6 are arranged in a fixed manner on the slide 4 in relation to the displacement direction 3. The clamping device 6 together with the slide 4 can be displaced relative to the support part 2 within the maximum possible displacement path 16, i.e. along the length of the elongate holes 10. The stops 26, i.e. the ends of the elongate holes 10 as seen in the displacement direction 3, delimit the maximum possible displacement path 16 in the illustrative embodiments shown.

For the sake of completeness, it is noted that it is not absolutely necessary to provide for the elongate hole 10 to be implemented in the support part 2 and for the clamping device 6 to be fastened in a fixed manner on the slide 4 in the displacement direction 3, as implemented here. According to the invention, it is just as possible to provide the elongate hole 10 in the slide 4 and to arrange the clamping device 6 in a corresponding fixed manner on the support part 2 in relation to the displacement direction 3. However, since in this case the rigidity of the slide 4 is reduced, this case is not to be preferred. In the case of the support part 2, losses in rigidity due to the elongate holes introduced can be more easily compensated for by an appropriate design than is possible with the slide 4.

Figure 6:
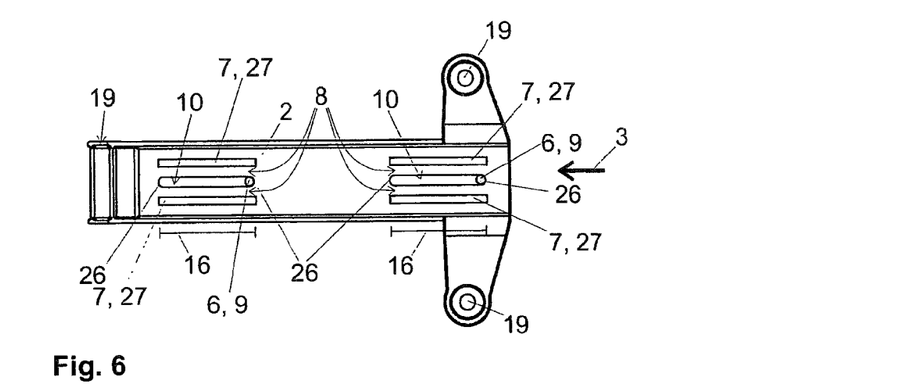
FIG. 6 is a top plan view of an embodiment of a support part without a slide, as disclosed herein.
Figure 7:
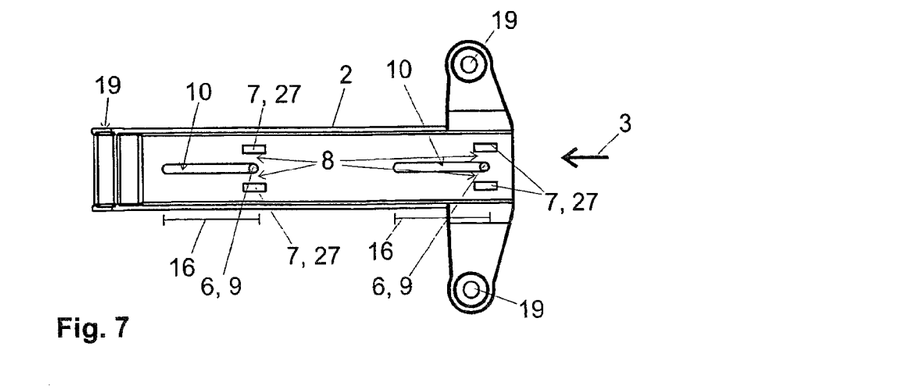
FIG. 7 is a top plan view of an alternate embodiment of a support part without a slide, as disclosed herein.

Various ways of configuring the webs 27 for formation of the contact points 7 spaced apart from the clamping device 6 as seen in the circumferential direction of the slide 4 are shown purely by way of example in FIGS. 6 and 7. The slide 4 is not illustrated in FIGS. 6 and 7, thus revealing the corresponding inner side of the support part 2. In both illustrations 6 and 7, the contact points 7 are designed as webs 27 on the support part 2. These webs 27 project beyond the adjacent regions of the support part 2 in the direction of the slide 4, thus forming the free spaces 8 mentioned when the slide 4 is fastened on the support part 2, as shown in FIG. 5. In FIG. 6, the webs 27 forming the contact points 7 are extended in the displacement direction 3 along the entire maximum displacement path 16. In FIG. 7, this longitudinal extent of the webs 27 and hence of the contact points 7 in the displacement direction 3 is made shorter relative to the maximum possible displacement path 16. A certain control or path-dependence of the energy absorption in the event of a crash, in which the slide 4 together with the clamping devices 6 is displaced relative to the support part 2 in the displacement direction 3, is already achieved by this means. For the sake of completeness, it is noted that the corresponding contact points 7 can, of course, also be obtained by webs 27 on the slide 4 that project in a corresponding manner beyond the outer contour of the slide 4. It is also clearly apparent in FIGS. 6 and 7 that provision can be made for the contact points 7 to be extended longitudinally in the displacement direction 3 and/or for the contact points 7 to be arranged at a distance from one another and/or one behind the other in the displacement direction 3.

If an even more accurate path dependence of the energy absorption along the displacement path in the displacement direction 3 is to be achieved, the wedge surfaces 12 already mentioned at the outset can be formed at various points. Common to all the preferred variants described below is the fact that the wedge surfaces 12 rise or fall along the displacement direction 3. However, the slope angles 34 are relatively small and are preferably in a range of between 1° and 5°, preferably between 1° and 3°. It is advantageous if the total lifts 35 achieved by means of the wedge surfaces 12 are in a range of from at most 1 mm to 5 mm, preferably 1 mm to 3 mm.

In order to be able to illustrate the wedge surfaces 12 better, they are shown in an exaggerated way in FIGS. 8 to 10 and 12.

Figure 8:
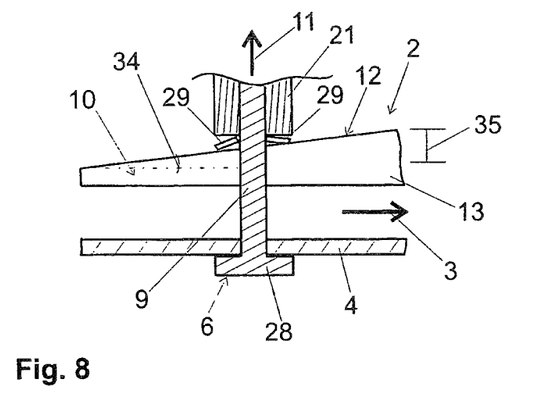
FIG. 8 is a partial section view of a portion of the steering column of FIG. 5, taken about section line BB.
Figure 9:
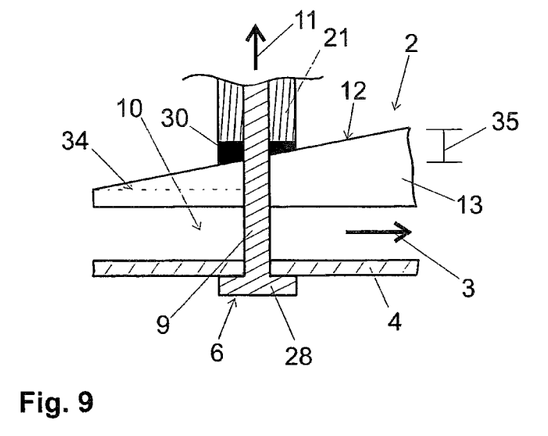
FIG. 9 is a partial section view of a portion of the steering column of FIG. 5, taken about section line BB.

FIGS. 8 and 9 show a first possibility for the embodiment of such wedge surfaces 12, in schematic form. Sections along section line BB from FIG. 5 are in each case shown in schematic and exaggerated form. In these embodiments, provision is made for the clamping device 6 to be passed through the elongate hole 10 extended longitudinally in the displacement direction 3, and for the wedge surfaces 12 to be arranged, preferably formed, directly on at least one wall 13, preferably both walls 13, bounding the elongate hole 10. It is advantageous if these walls 13 extend parallel to the displacement direction 3, and this then applies also in a corresponding manner to the wedge surfaces 12. It is clearly apparent in FIG. 8 how the fastening bolt 9 of the clamping device 6 is fixed on the slide 4 in relation to the displacement direction 3. At the support part 2, the fastening bolt 9 and hence the clamping device 6 are passed through the elongate hole 10 in the support part 2. The clamping nut 21 of the clamping device 6 is supported on the wedge surface 12 of the wall 13 bounding the elongate hole 10 via a snap ring 29 in FIG. 8 and via a wedge-shaped intermediate part 30 in FIG. 9. In the event of a crash, displacement of the slide 4 in the displacement direction 3 inevitably entails displacement of the clamping device 6 in the displacement direction 3. By virtue of the wedge surface 12, the forces counteracting this displacement increase in the displacement direction 3, thereby ensuring that the desired path dependence of energy absorption in the event of a crash is achieved. Of course, the slope angles 34 and direction of taper of the wedge surface 12 can also be designed differently, thus making it possible to achieve different kinds of path dependence of energy absorption. In simple terms, the desired path dependence can be achieved by appropriate variation of the thickness of the walls 13 bounding the elongate hole.

Figure 10:
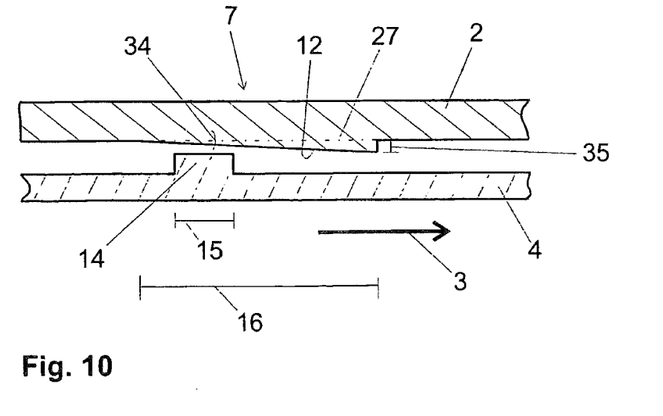
FIG. 10 is a partial section view of a portion of the steering column of FIG. 5, taken about section line CC.

FIG. 10 then shows by way of example that such wedge surfaces 12 can be formed not only in the region of the elongate holes 10 but also in the region of the contact points 7. FIG. 10 shows the section along section line CC from FIG. 5 in the displacement direction 3. In this illustrative embodiment, a corresponding wedge surface 12 is formed on the support part 2 or the web 27 thereof that forms the contact point. The wedge surface 12 interacts with a projecting element 14, which is formed or arranged on the slide 4. The longitudinal extent 15 of the projecting element 14 in the displacement direction 3 is shorter than the maximum possible displacement path 16. By means of such an embodiment too, path dependence of the energy absorption in the event of a crash can be achieved. Of course, it is also possible, in a reverse embodiment, for the wedge surface 12 to be on the slide 4 and for the projecting element 14 to be on the support part 2 or on the web 27.

Figure 11:
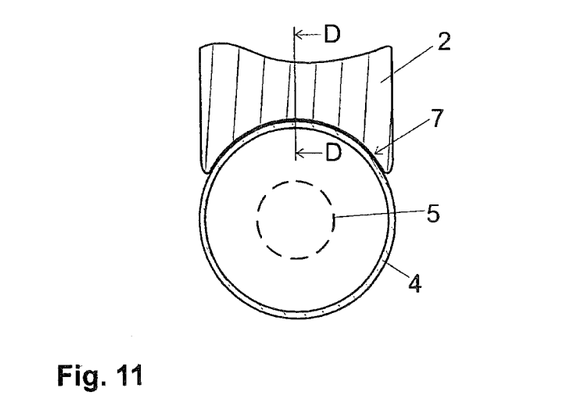
FIG. 11 is a partial section view of a portion of an embodiment of a steering column of the present disclosure, taken about section line EE of FIG. 12.
Figure 12:
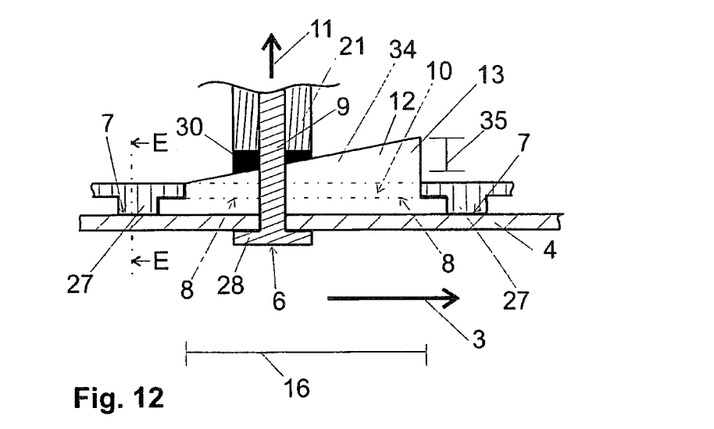
FIG. 12 is a partial section view of a portion of an embodiment of a steering column of the present disclosure, taken about section line DD of FIG. 11.

Whereas, in the illustrative embodiments described so far, the contact points 7 are spaced apart from the clamping device 6 in the circumferential direction of the slide 4, FIGS. 11 and 12 show schematic illustrations relating to an illustrative embodiment in which the contact points 7 are spaced apart from the clamping device 6 in the displacement direction 3 in order to obtain the free spaces 8 between the slide 4 and the support part 2 in the regions between the clamping device 6 and the contact points 7. FIG. 11 shows a section EE from FIG. 12, and the section line DD in FIG. 11 in turn shows the section plane illustrated in FIG. 12. The section according to FIG. 11 is drawn in the region of a contact point 7. The section plane formed there is normal to the steering spindle longitudinal axis 17. It is readily apparent how the slide 4 rests fully on the support part 2 in the region of the contact point 7. In FIG. 12 and hence in the section parallel to the displacement direction 3, it is possible to see the clamping device 6 and how it is arranged spaced apart from the two contact points 7. Here too, the clamping device 6 can be displaced along the maximum possible displacement path 16 in the displacement direction 3 in an elongate hole 10 in the support part 2 when there is a corresponding crash. Similarly to the situation in FIGS. 8 and 9, a wedge surface 12 is arranged on each of the walls 13 of the support part 2 which bound the elongate hole 10 in order to control the path dependence of the energy absorption. What has been stated above applies to the angles 34 and to the total lift 35 of the wedge surface 12 that can be achieved. In this illustrative embodiment too, it should be noted that the webs 27 forming the contact points 7 could also be arranged in a fixed manner on the slide 4, instead of on the support part 2.

The invention claimed is:

1. A steering column for a motor vehicle, comprising:
at least one column slide;
a steering spindle disposed in said column slide and supported in said at least one column slide so as to be rotatable about a longitudinal axis of said spindle;
at least one clamping device in communication with said column slide;
a support part coupled to said at least one column slide by said at least one clamping device, said support part having at least two contact points disposed at mutually opposite sides of said clamping device at a distance therefrom and configured to support said slide thereon, said support part being configured to both fasten said column slide and steering spindle to a body of the motor vehicle and permit displacement of said slide in a displacement direction in the event of a crash by the motor vehicle, said support part and said slide defining at least one free space disposed between said slide and support part in regions between said clamping device and each of said at least two contact points; and
at least one wedge surface disposed at an interface between at least one of said column slide and said support part, said clamping device and said support part, and said clamping device and said column slide, said wedge surface being configured to rise or fall along the displacement direction.

2. The steering column of claim 1, wherein said support part defines an elongated hole disposed therein and extending longitudinally in the displacement direction, and wherein said clamping device is fixed at a first end to said column slide and passes at a second end thereof through said elongated hole of said support part so as to permit a sliding motion between said column slide and said support part in the displacement direction.

3. The steering column of claim 1, wherein said column slide defines an elongated hole disposed therein and extending longitudinally in the displacement direction, and wherein said clamping device is fixed at a first end to said support part and passes at a second end thereof through said elongated hole of said column slide so as to permit a sliding motion between said column slide and said support part in the displacement direction.

4. The steering column of claim 3, wherein the clamping device includes at least one fastening bolt, which passes through said elongated hole.

5. The steering column of claim 1, wherein the clamping device is configured to clamp the column slide to the support part in a clamping direction that is orthogonal to the displacement direction.

6. The steering column of claim 1, wherein said support part defines an elongated hole disposed therein extending longitudinally in the displacement direction, wherein said clamping device passes through said elongated hole, and wherein the wedge surface is integrally disposed on a wall adjacent to and bounding the elongated hole.

7. The steering column of claim 6, wherein the wedge surface rises or falls in a direction parallel to a clamping direction in which the column slide is clamped onto the support part by said clamping device in a region of said wedge surface.

8. The steering column of claim 1, further comprising a projecting element affixed to one of said column slide, said support part, or said clamping device, wherein said wedge surface is affixed to another of said column slide, said support part, or said clamping device, wherein said projecting element is configured to slide along said wedge surface in the displacement direction in the event of a crash by a motor vehicle in which the steering column is installed.

9. The steering column of claim 1, wherein said contact points are spaced apart from said clamping device in at least one of the displacement direction or a direction orthogonal to the displacement direction.

10. The steering column of claim 1, wherein said steering spindle is supported in a steering spindle bearing unit that is configured to permit rotation of said steering spindle about said spindle's longitudinal axis.

11. The steering column of claim 10, wherein said column slide is said steering spindle bearing unit.

12. The steering column of claim 10, wherein said steering spindle bearing unit is coupled to said support part with said column slide disposed there between.

13. The steering column of claim 1, further comprising:
- a fastening lug integrally formed at a first end of said support part and having a pivot axis disposed there through, said fastening lug configured to rotatably couple said support part to a first location of the said motor vehicle so as to permit said support part to be rotatably moveable in a vertical direction about the pivot axis with respect to the motor vehicle;
- a holding part in communication with a second rotatable end of said support part, configured to couple said support part to a second location of the motor vehicle and permit vertical rotational movement about the pivot axis of said fastening lug between said support part and the motor vehicle; and
- a fixing device in communication with said support part and said column slide, which fixing device is selectively moveable between an open and a closed state and is configured to selectively restrict or permit linear movement between said support part and said column slide, and restrict or permit rotational movement between said support part and said holding part, wherein when said fixing device is in the open state, said column slide is moveable relative to said support part in the direction of the steering spindle longitudinal axis and the support part is rotatable relative to the holding part about the pivot axis, and wherein when said fixing device is in the closed state, said column slide is linearly fixed relative to said support part and said support part is rotationally fixed relative to said holding part, when a force (F) acting on said steering spindle in the direction of the steering spindle's longitudinal axis does not exceed a predetermined value.

14. The steering column of claim 1, wherein said contact points are extended longitudinally in the displacement direction.

15. The steering column of claim 1, wherein said contact points are spaced apart and one behind the other in the displacement direction.

16. The steering column of claim 1, wherein said contact points are formed over an entire maximum possible displacement path in the displacement direction.

17. The steering column of claim 1, wherein said steering spindle, together with a steering wheel affixed thereto and said column slide, are displaceable in the displacement direction relative to said support part and the motor vehicle body to which said support part is affixed, when the motor vehicle in which the steering column is installed is involved in a crash.

* * * * *